March 2, 1954
R. L. COMSTOCK
2,671,009
METHOD OF DRYING CALCIUM CHLORIDE
AND PRODUCT PRODUCED THEREBY
Filed Oct. 6, 1948
2 Sheets-Sheet 1
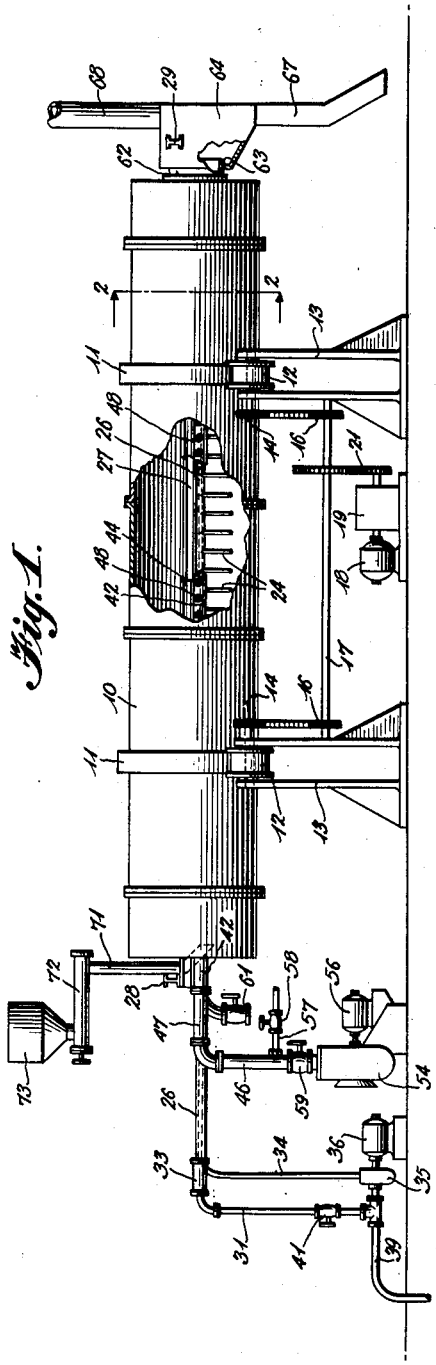
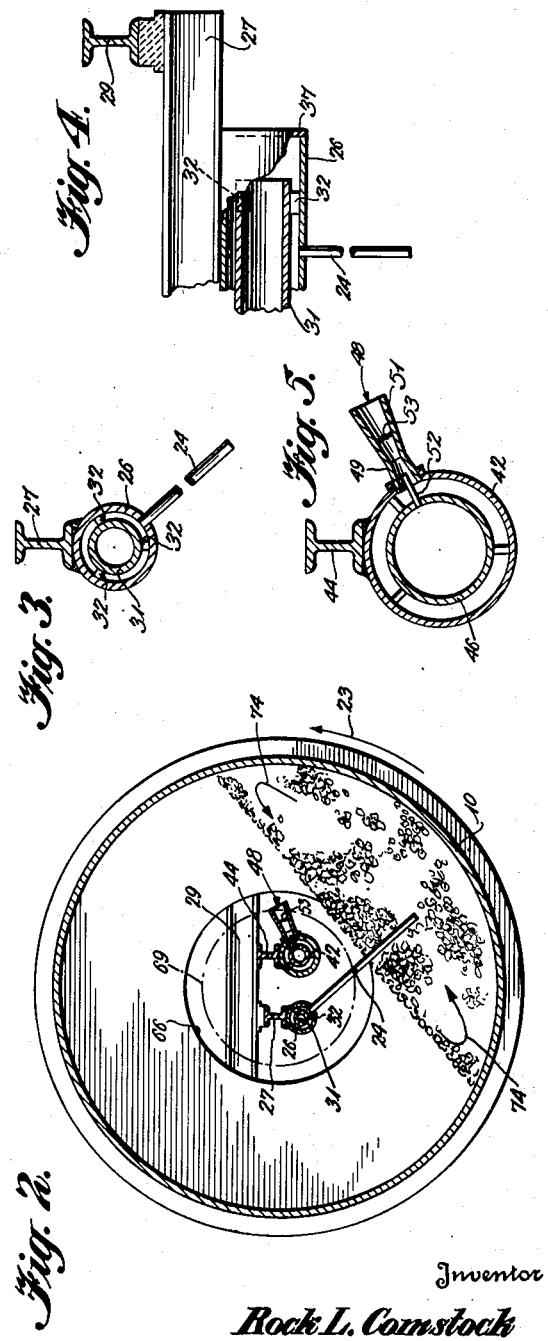
Inventor
Rock L. Comstock
By Bacon & Thomas
Attorneys March 2, 1954   R. L. COMSTOCK   2,671,009
METHOD OF DRYING CALCIUM CHLORIDE
AND PRODUCT PRODUCED THEREBY Filed Oct. 6, 1948   2 Sheets-Sheet 2

INVENTOR.
Rock L. Comstock
BY
Brown, Jackson, Boettcher & Dienner

Patented Mar. 2, 1954

2,671,009

UNITED STATES PATENT OFFICE 2,671,009

METHOD OF DRYING CALCIUM CHLORIDE AND PRODUCT PRODUCED THEREBY

Rock L. Comstock, Weeks, La., assignor to Morton Salt Company, Chicago, Ill., a corporation of Illinois Application October 6, 1948, Serial No. 53,064

9 Claims. (Cl. 23—90)

This invention relates, generally, to a novel and unique drying method and apparatus, and the new and useful products produced thereby, and having unique shape or configuration resulting from such method and apparatus. The invention is particularly adapted to the drying of aqueous solutions of calcium chloride, so as to produce nuggets or pellets of calcium chloride which have new and improved characteristics, due to the unique shape or configuration thereof.

The present application is a continuation-in-part of my prior application, Serial No. 781,201, filed October 21, 1947, now abandoned.

The method and apparatus of the present invention are applicable to solutions of various solids and various solvents therefor, and their usefulness is not primarily dependent upon the chemical properties of the solute or solvent. Rather, it is the physical properties of the materials, particularly those of the solute, especially the solubility thereof in the particular solvent system employed and the viscosity of the resulting solutions, which determine the applicability of the present invention to a given solution.

In general, the invention involves the introduction of the solution to be evaporated into the interior of a heated bed of pellets or nuggets of the solute, the bed having a circulating motion, due to the fact that it is carried in the lower portion of a rotating cylinder, the principal axis of which is generally horizontal.

The circulating bed is suitably heated and the solution is introduced therein at an appropriate rate, such that the outer portions or layers of the circulating bed contain the pellets or nuggets in dry form.

The pellets or nuggets grow in size as sufficient layers of solute are added or built up on the initial particles. As will appear hereinafter, the exterior shape or configuration of the pellets or nuggets becomes modified from the small sizes to the large sizes, and it is possible so to control the drying process that nuggets or pellets of the desired uniform size are obtained.

A suitable manner of causing circulation of the particles of the bed is to employ a kiln rotating about a substantially horizontal axis and partly filled by the bed. By reason of the rotation of the kiln, the bed is agitated and moves with a generally circulatory motion. The particles or masses in the mid-portion of the bed receive the additional layers of solid material and as they become larger, they work to the exposed surface of the bed and into contact with the walls of the kiln. On the other hand, the smaller particles at the periphery of the bed work to the interior of the bed. Heat is more easily applied to the periphery of the bed, and the inwardly moving masses carry such heat into the interior of the bed. Also, by delivering the solution into the interior of the heated bed, the layers of solid material left on the masses in the mid-portions of the bed are substantially dry before such masses reach the periphery of the bed, and therefore do not adhere to the walls of the kiln. Also, the layers are substantially dry before the masses reach the region of more intense agitation near the periphery of the bed. If the solution is added at too rapid a rate or too near the periphery of the bed, or the temperature drops too low, such that the masses become moist in the peripheral portions of the bed, they may adhere to the wall of the kiln to form rings, and control over the particle size may be lost. When operated under proper conditions of temperature, concentration of solution, rate of rotation of the kiln, etc., the abrasion of the masses in the bed due to rotation of the kiln does, however, continuously break off small portions of the masses to supply nuclei for development of further masses. The new masses gradually grow in size, due to repeated application of the solution thereto and assume a characteristic shape or configuration which will be elaborated on hereinafter. As the nuggets approach a predetermined maximum size they tend to remain near the periphery of the bed and move longitudinally of the bed so as to be continuously discharged through an opening at one end of the rotating kiln. In addition to the above reasons for delivering the solution into the interior of the bed, it is to be noted that such an operation selectively supplies the solution to be dried to the smaller particles.

The present invention enables the solids of a solution containing such solids to be directly converted into a marketable product having unique physical form and properties. It completely eliminates the employment of conventional evaporators and crystallizers and combines the evaporator, crystallizer and dryer in one simple apparatus. It eliminates the production of fines and the screening and reworking of fines heretofore normally required in order to secure particles of a desired size from material discharged from a rotary dryer. It virtually eliminates dust loss as substantially no fine dust is produced or carried away in a stream of drying gas. There is no adhesion to or build-up of rings of the material on the dryer walls, a condition commonly encountered in conventional rotary dryers handling viscous solutions.

Heretofore, solid materials, such as calcium chloride and the like, have been available either in crystalline form, or in the form of non-uniform, sharp-edged particles as produced by crushing or otherwise comminuting large lumps. On the other hand, the products as produced by the present invention are in the form of nuggets or pellets having knobs or protuberances of varying degrees of magnitude or sharpness, depending upon the size of the nuggets and, in part, upon the control of the production thereof. The pellets or nuggets can be made with a high degree of uniformity both in over-all size, as well as in the extent of the knobs or protuberances projecting therefrom. Such products have certain advantages over the previous forms in which many materials have been available. Thus, the nuggets or pellets are relatively free-flowing; have little or no tendency to cake; and tend to resist materially breakage or cleavage in handling, thereby minimizing the production of fines. The nuggets or pellets are particularly useful in the packing of towers for contact between solids and liquids, gases or vapors. In such packings, the frictional resistance to gas, liquid or vapor for the area exposed, is reduced to a minimum, as is also the tendency for the packings to develop channels. The nature of the shape and configuration of the nuggets or pelelts is such as to greatly minimize the tendency for bridging between the walls of a tower or chamber in which they are used as the packing. Continued application of the nuggets and pellets indicate that they will find wide demand and afford many additional applications, other than those specifically suggested above. Because of the relatively large surface areas exposed per unit weight, nuggets or pellets of the present invention have a relatively rapid rate of surface action which may be manifested as an increased rate of solution in some instances, or as an increase in reactivity in other instances. These increases in surface activity are specifically of value in the case of calcium chloride which finds widespread use as a dehydrating agent.

An important object of the invention is the provision of a new and useful method and apparatus for recovering solids in the form of uniformly shaped nuggets or pellets, directly by evaporation of solutions of said solids.

An important object of the invention is the provision of a new and useful method of evaporating aqueous solutions of solid solutes by introducing the solution into the midst of a bed of the solute in the form of nuggets or pellets, with at least the outer layers of said bed being in circulation and containing the nuggets or pellets in substantially dry form. Another object of the invention is the provision of new and improved apparatus for thus evaporating solutions of solid solutes wherein provision is made for introducing the solution at appropriate rate into the midst of said bed of preformed pellets or nuggets.

Still another important object of the invention is the provision of a new and useful method of an apparatus for producing pellets or nuggets of solutes, particularly calcium chloride, by evaporation of solutions thereof and in such manner that the nuggets or pellets will have, within a rather wide range of sizes, substantially uniform size and configuration.

Certain other objects and advantages of the invention will, in part, be obvious and will, in part, appear hereinafter.

For a more complete understanding of the nature and scope of this invention, reference may now be had to the following detailed description thereof taken in connection with the accompanying drawings, in which:

Figure 1 is a somewhat diagrammatic elevational view, partly in section, of an apparatus suitable for employment in the present invention;

Figure 2 is a cross-sectional view on an enlarged scale taken on the line 2—2 of Figure 1;

Figure 3 is a fragmentary cross-section on a still further enlarged scale of a suitable solution feed conduit assembly;

Figure 4 is a fragmentary elevation, partly in section, of the solution feed conduit assembly of Fig. 3 showing the support therefor;

Figure 5 is an enlarged fragmentary cross-section of a gas conduit and burner arrangement;

Figure 6:
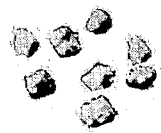
Figure 6 is a photograph (actual size) of a representative group of nuggets of calcium chloride produced in accordance with the present invention and having an average diameter of approximately one-quarter of an inch and a true density of 1.32 grams per milliliter.

Referring more particularly to the drawings, a rotary kiln 10 is shown as having external peripheral tracks 11 engaging flanged rolls 12 supported in suitable standards 13. The kiln may be rotated in any desired manner, for example, by rotating the rolls 12 through sprockets 14 on the roll shafts connected by chains to sprockets 16 on a drive shaft 17 driven from a motor 18 through a speed reducer 19 and a chain drive 21. As shown in Figure 2, the interior of the kiln 10 is preferably free of baffles or flanges attached to the side walls thereof and in operation, a bed 22 of particles of the dry solid assumes a position similar to that shown upon rotation of the kiln in the direction of the arrow 23. The average angle which the exposed surface of the bed makes with the horizontal will usually be between 35° and 40°.

The solution to be dried may be introduced into the interior of the bed 22 by a plurality of small feed pipes 24 which may be carried by and communicate with the interior of a main longitudinally extending feed pipe 26. The feed pipes 24 preferably extend into the bed substantially normal to the exposed surface thereof and may thus make an angle of approximately 52½° with the horizontal. The feed pipe 26 may be secured in any desired manner, for example, by welding to a stiffening member such as an I-beam 27 in turn secured to cross-beams 28 and 29 outside the inlet and discharge ends, respectively, of the kiln 10, the supports for the cross-beams 28 and 29 not being shown, in order to avoid complication of the drawing.

The main feed pipe 26 may have a smaller pipe 31 positioned inside of and running substantially the entire length of the pipe 26, the pipe 31 being held in spaced relationship with the inner surfaces of the pipe 26 by suitable spacers 32, preferably secured to the pipe 31. As shown in Fig. 1, the pipe 31 may leave the pipe 26 at the inlet end of the pipe 26 through a suitable fitting 33. The solution to be dried may be pumped through a pipe 34 into the annular space between the pipes 26 and 31 by means of a suitable pump 35 driven by a motor 36. As shown in Fig. 4, the remote end of the pipe 26 may be closed at 37 and the pipe 31 may terminate a short distance from the closed end 37 of the pipe 26. The solution to be dried thus flows through the annular space between the pipes 26 and 31 toward the further end thereof, a portion being discharged from the pipe 26 in a plurality of small streams through feed pipes 24. Excess solution returns through the pipe 31 to the inlet pipe 39 for the pump 35. It will be understood that the pipe 39 withdraws solution to be dried from any suitable source, such as a tank, not shown. A valve 41, which may be an adjustable pressure release valve in the pipe 31, enables any desired pressure within wide limits to be imposed upon the solution discharged from the pipe 26 through the feed pipes 24 to regulate the rate of feed of solution. The valve 41, particularly if the speed of the pump 35 can be varied, may also regulate the volume of solution recirculated to prevent excessive heating or crystallization of solution in the feed pipes 26 and 31 thus to assure continued free flow of solution, through distributing pipes 24. If recirculation is not required, it is apparent that the inner pipe 31 may be omitted and the solution delivered directly into the main feed pipe 26.

Heat may be supplied to the bed 22 in the kiln 10 in any desired manner, such as by heating the exterior of the kiln by suitable heating elements or heating medium to cause transmission of heat to the bed of nuggets, or by internal radiant heaters or the introduction of heated gases into the kiln through an end thereof, through nozzles longitudinally along the interior of the kiln, or through louvers in the walls, etc. The manner of heating is not material so long as sufficient heat is imparted to the bed of nuggets to cause rapid evaporation of the solution and so long as the heat is not so locally concentrated as to cause excessive production of fines. A particularly advantageous manner of heating in large scale apparatus is to employ a plurality of burners within the kiln itself. One way of accomplishing this is to provide a conduit 42 extending longitudinally into the inlet end of the kiln 10 and supported by a stiffening member such as an I-beam 44 in substantially the same manner that the liquid conduit 26 is supported. Stiffening beam 44 may likewise be secured to the cross-beams 28 and 29 at the inlet and discharge ends of the kiln, respectively. The conduit 42 may likewise be provided with an interior conduit 46 entering the conduit 42 through a suitable fitting 47. The purpose of the conduit 46 is to supply a combustion mixture of gas and air to a plurality of burners 48 spaced along the conduits 42 and 46 and the purpose of the conduit 42 is to supply secondary air to the burners 48.

Suitable burners 48 are more clearly shown in Fig. 5 and each may comprise a tubular member secured in an opening through the wall of the conduit 42 and having an initial converging portion 49, then a diverging portion 51. The conduit 46 may be provided with a nipple 52 entering the converging portion 49 of the burners 48 for supplying the gas mixture to the burners. To prevent backfiring of the flame, each of the burners 48 may be provided with a screen 53.

As shown in Fig. 1, an air pump 54, driven by a motor 56, may supply primary air to the conduit 46. Any suitable combustion gas, such as illuminating gas, producer gas, etc., may be introduced into the conduit 46 through a pipe 57 provided with a regulating valve 58. The conduit 46 may also be provided with a damper valve 59 to control the amount of primary air mixed with the gas from pipe 57. The conduit 42 may have a damper valve 61 at its inlet end for controlling the amount of secondary air supplied to the burners 48. The remote ends of both conduits 42 and 46 are closed and it will be apparent that the air pump 54, which may for example be a centrifugal pump or fan, in conjunction with the gas inlet pipe 57, will supply a mixture of gas and air to the burners 48 through the conduit 46. Secondary air is supplied to the burners 48 through the conduit 42 at substantially atmospheric pressure, the nipples 52 operating as jets to cause feed of secondary air into the burner from the conduit 42, the amount of secondary air being controlled by the damper 61.

The burners 48 are preferably positioned to direct the flame along the upper surface of the bed 22 without actual contact of the flame with the particles forming the bed 22. With the arrangement shown, it has been found that the burners are preferably positioned to make an angle of approximately 20° with the horizontal, i. e., an angle between 15° and 25° with the exposed surface of the bed. Heat is transferred to the bed by radiation and convection and also the wall of the kiln 10 is heated to carry heat to the bed. Burners of the type described produce a relatively short flame, but various other types, including burners for liquid, or powdered fuel, may be employed, and as indicated above, heat may be supplied to the bed 22 in any desired manner, for example, by the circulation of heated gases of lower temperature than flame temperature through the bed. If heat is applied internally of the kiln, the exterior walls of the kiln will ordinarily be provided with suitable heat insulation (not shown).

At the discharge end, the kiln 10 may be provided with a discharge portion in the form of a cylinder 62 projecting axially therefrom and received in a concentric aperture 63 in a stationary gas and solids separating chamber 64. The cross-beam 29 for supporting one end of the gas and liquid conduits may project through the walls of the chamber 64. The opening through the discharge portion 62 is indicated at 66 in Fig. 2, and in continuous operation there is a constant flow of nuggets of solid material through the opening 66 and discharge member 62 into the separation chamber 64. These nuggets roll downwardly into the chamber 64 and may be discharged through a chute 67, combustion gases flowing upwardly and discharging through a flue 68. The flue 68 should provide sufficient draft to prevent discharge of combustion gases through the inlet opening of the kiln indicated in dash-dot lines at 69 in Fig. 2. It will be noted that the inlet opening to the kiln is of smaller diameter than discharge opening 66. In general, the kiln 10 will have its axis substantially horizontal or with only a very slight slope toward the discharge end, the bed 22 maintaining a substantially uniform level while larger nuggets or pellets gradually move toward the discharge end to be discharged therefrom.

In certain operations it may be desirable to feed particles into the inlet end of the kiln in measured amounts, for example, through a chute 71, which in turn may receive the particles from any suitable measuring device such as a screw conveyor 72 connected to a hopper 73. The particles thus fed into the kiln will ordinarily be of the same material as that being recovered from solution. Such particles may be of small size to serve as nuclei in the drying process or may be of any size smaller than the desired size being produced in the process. As discussed below, even relatively large sized particles of irregular shape are converted to nuggets or pellets of uniform size and shape.

The apparatus shown in the drawing is particularly suitable for large scale operation. As a specific example of an apparatus suitable for the production of approximately 40 tons of dried calcium chloride a day, the kiln 10 may be 9 feet in diameter and approximately 53 feet long. The inlet opening 69 may be 3 feet in diameter while the discharge opening 66 may be 3 feet, 9 inches in diameter. The liquid conduit 26 may, for example, be a 3 inch pipe enclosing a 2 inch pipe forming the conduit 31. Approximately 50 feed pipes 24, which may be of ⅛" pipe and spaced 12 inches apart along the conduit 26 may be employed. The maximum depth of the bed measured normally of its exposed surface may be approximately 2 feet, 8 inches and the feed pipes 24 may extend into the bed approximately 13 inches. The secondary air conduit 42 may be an 8" pipe containing a 6" pipe forming conduit 46 for gas mixture. The secondary air conduit 42 may carry, for example, 53 burners 48 spaced approximately 12 inches apart.

When drying calcium chloride, a solution having a concentration of approximately 55% by weight may be delivered into the interior of the bed 22 through feed pipes 24 under a pressure delivering approximately 40 tons of calcium chloride on a dry basis. The feed of fuel and air to the gas burners should be adjusted to produce a temperature of the solid mass of nuggets of approximately 400° F., and the speed of rotation of a dryer having a 9 foot diameter may be adjusted to produce approximately 25 feet per minute peripheral speed, i. e., a rotational speed of 0.88 R. P. M. The nuggets or pellets obtained have an average diameter of about ⅜ inch.

In starting up the process, a bed of any desired granular or spherical particles, preferably calcium chloride particles, is initially positioned in the kiln to provide nuclei for nugget formation. This bed circulates, by reason of the rotation of the kiln as indicated by the arrows 74. The circulation of the bed and the drying of solution on the particles produces nuggets or pellets which work to the outer portions of the bed. The nuggets or pellets in the peripheral portion of the bed receive heat both from the flames from the burners 48 by radiation and by convection of gases, as well as by contact with the heated walls of the kiln. As larger nuggets continue to be formed in the interior of the bed, these nuggets work outwardly and are replaced by smaller particles from the outer portions of the bed carrying heat from the gas flames and the walls of the kiln in addition to heat conducted through the bed.

Agitation of a bed of particles of mixed sizes will tend to settle out the particles of smaller size, leaving the larger particles on top. Agitation is provided by rotation of the kiln and the smaller particles tend to settle faster than the larger particles. However, the larger particles roll down the incline formed by the top of the bed and are carried underneath the bed so that a zone in which there is a concentration of smaller particles is formed in the intermediate portions of the bed. The rotation of the kiln carries the particles in the lower portion of the bed to the upper edge of the inclined upper surface of the bed and the particles start rolling down such incline. An automatic classification or segregation takes place, the smaller particles sink into the bed while the larger particles roll completely down the bed and are thus carried around the periphery of the bed until they are displaced longitudinally of the kiln and are discharged from the kiln.

Irregular pieces do not roll down the incline as readily as do the nuggets or pellets, but tend to sink downwardly into the bed where they are moistened and subjected to abrasion so as also to be converted into nuggets or pellets. The smaller nuggets or pellets and irregular particles displace the nuggets or pellets of larger size in the interior of the bed. The latter gradually work to the periphery of the bed and are again subjected to heating and the classification discussed above.

Introducing the solution to be dried through the feed pipes 24 into the interior of the bed moistens the particles to produce a layer of solution thereon. This solution rapidly evaporates due to the heat in the particles, to leave layers of solid material on the particles. In general, the smaller particles are thus coated because of the concentration of such smaller particles in the region of discharge of the solution into the bed. Under proper conditions of operation, the resulting nuggets or pellets are substantially dry by the time they reach the outer portions of the bed and come into contact with the walls of the kiln. Abrasion of the nuggets or pellets, as well as irregular particles in the bed produces smaller particles which form nuclei for additional nuggets or pellets. However, no substantial amount of dust is formed. Instead, particles of substantial size break off from the irregular particles to form the nuclei. One apparent reason for this is that the rapid boiling of water from the solution causes craters and projections of deposited solids to be formed on the nuggets or pellets during release of vapor, which projections are continuously broken off.

The action which takes place in a heated bed of circulating particles when a solution is introduced into an intermediate portion of the bed has been described at length with respect to the evaporation of calcium chloride solutions but this description is entirely applicable to the drying of other solutions in which the solvent and solute have the requisite physical properties discussed above. Also, it is the type of agitation rather than the particular mechanism for producing the agitation which causes the automatic classification of particles and the growth of the nuggets or pellets. If desired, apparatus may be employed which will carry the particles forming the lower portion of the bed laterally and upwardly to an upper edge of an inclined upper surface of the bed, for example, blades extending longitudinally near the inner periphery of a horizontal stationary cylindrical kiln and rotated about the axis of the kiln, or a wide conveyor flight moving laterally and upwardly over suitable supports to produce a trough or concave upper surface for holding the bed may be employed.

It is important that the solution to be evaporated be introduced into the interior of the mass at a point ranging between approximately 10% and 45% of the depth of the bed. If the feed of the soution is too near the surface, wet nuggets or pellets in the peripheral portions of the bed become rapidly abraded to produce fines or come into contact with the wall of the kiln and adhere thereto to produce adherent rings. Substantially, the same action takes place if the discharge of the solution to be evaporated is too far down in the bed so as to be too near the wall of the kiln. That is to say, the kiln should be operated so that the particles in the mid-portion of the bed are wetted with solution whereas the particles near the exterior portion of the bed are substantially dry.

Although the invention has been described particularly with respect to large scale operations, it has been successfully carried out on a much smaller scale. For example, a rotary kiln 24 inches in diameter and 56 inches long has been operated at a rotational speed of approximately 5 R. P. M. to produce approximately 50 lbs. of dried calcium chloride per hour. The kiln was heated by products of combustion delivered into the kiln through 5 outlets spaced about 10 inches apart longitudinally of the kiln and directed in a manner similar to that of the burners 48 in Fig. 2. The calcium chloride solution had a concentration of approximately 55% by weight and was delivered into the bed through thirteen 1/8" pipes entering the bed in a manner similar to that shown in Fig. 2. These pipes ran individually from the inlet end of the kiln so as to provide for separate feed control for each pipe. The maximum depth of the bed of nuggets or pellets was approximately 7 1/2 inches and the individual feed pipes discharged at approximately 3 inches below the top surface of the bed and at about 3 inch intervals longitudinally. The weight of the bed of material was approximately 200 lbs. and the temperature was 365° F., plus or minus 10° at all points. The temperature of the gas discharged over the bed was between 900° and 1000° F. and the temperature of the waste gases was approximately 490° F. The temperature of the solution discharged into the bed ranged between 70° and 102° C. A continuous discharge of nuggets or pellets at the rate of approximately 50 lbs. per hour was obtained, the nuggets or pellets being of a size such that 65% were retained on a 3/8 inch screen and the balance larger than 1/4 inch. These nuggets or pellets had rounded knobs or protuberances thereon and contained minute air pockets.

Substantial variations can be made in the operating conditions. For example, the temperature of the bed was dropped to 330° F. by reducing the amount of heated gases introduced into the kiln, in which case the temperature of the waste gases was 415° F. Also, the speed of rotation of the kiln was dropped to 3.7 R. P. M., and under these conditions, nuggets or pellets of the same type as described above were formed, except that 45% of the final nuggets or pellets were larger than 3/8 inch as compared with 65% at a temperature of 365° F., and a rotation of 5 R. P. M.

In another run, the speed of rotation of the kiln was increased to 8 R. P. M. and the temperature of the bed was adjusted to 335° F., the waste gases temperature being 452° F. Nuggets or pellets of the same type were continuously produced in which 31% were larger than 3/8 inch, the remainder being larger than 1/4 inch.

In the drying of calcium chloride solution, it has been found that the concentration of the solution should range from approximately 45% to 60% calcium chloride by weight, the optimum range being between 50% and 55%. With concentrations much above 57%, there is danger of deposition of solid calcium chloride in the feed pipes to cause clogging thereof, and in general, concentrations as high as 60% can only be employed when the feed conduit system is heated above ambient temperatures to increase the solubility of the calcium chloride. Below 45% concentration, the large amount of water requiring evaporation seriously limits the capacity of the kiln.

The viscosity of the solution has a considerable bearing upon the success of the process. If the solution is too fluid, it spreads too smoothly and thinly to form projections or craters upon drying and nuclei are not produced at a sufficiently rapid rate. By feeding nuclei from an outside source, however, relatively dilute or low viscosity solutions can be successfully employed. Merely as a guide, the viscosities of various solutions of calcium chloride which have been found usable in a process involving no feed of nuclei from an external source are as follows:

| $CaCl_2$, percent by weight | 45% | 50% | 55% |
|---|---|---|---|
| | Viscosity | Viscosity | Viscosity |
| Temperature: | | | |
| 70° C | 1.35 | 1.43 | 1.85 |
| 80° C | 1.24 | 1.40 | 1.71 |
| 90° C | 1.22 | 1.32 | 1.61 |

The viscosities given above are reported upon the basis that the viscosity of water at the same temperature is considered to be unity.

It has also been found that the average temperature of the bed of calcium chloride should range between 320° and 500° F., with the optimum range being between approximately 380° and 430° F. As discussed in more detail later, higher temperatures in the above range, all other conditions remaining constant, tend to produce smaller nuggets or pellets while lower temperatures tend to produce larger nuggets or pellets. In order to prevent moist nuggets or pellets from reaching the periphery of the mass with the deleterious results above discussed, the temperature of the bed should ordinarily be at least 100° F. above the boiling point of the solution being dried.

It has also been found that the peripheral speed of the rotating kiln should range between 15 and 50 feet per minute, with an optimum range between 20 and 30 feet per minute. Higher speeds within the range above given tend to produce smaller nuggets or pellets while the lower speeds tend to produce larger sized nuggets or pellets. Higher speeds than those in the above range tend to produce dust while speeds below such range prevent adequate distribution of the solution and retard heat transfer, thus reducing capacity.

The depth of the bed of material in the rotary dryer should ordinarily not be less than approximately 3 inches and is preferably considerably greater in order to allow proper distribution of the solution being evaporated in the interior of the bed and allow time for drying of the nuggets or pellets before they reach the peripheral portions of the bed. Larger sized dryers than that given in the first described specific example and with a greater bed depth are, however, easily feasible.

The feed of solution should be below the surface of the bed and preferably at a distance from the surface equivalent to approximately 10% to 45% of the depth of the bed. As stated above, various types of heating arrangements may be employed so long as sufficient heat is carried into the bed to cause rapid boiling of the solution being evaporated, and in general, the heating of the bed should be as uniform as possible. Any local overheating will, in general, cause too rapid production of nuclei while at points of too low heat, there is likely to be disintegration of the nuggets or pellets or sticking thereof to the wall of the kiln.

The above discussed ranges are applicable specifically to the drying of calcium chloride solutions and are also generally applicable to the drying of aqueous solutions, particularly those in which the solute is an inorganic salt. Merely by way of example, other solutions to which the invention may be applied are water solutions of magnesium chloride, mono-sodium phosphate, di-sodium phosphate and sodium silicate. It will be apparent that with other solvents and solutes, the operating conditions may vary widely from those given above and no precise ranges can be given. As a guide in drying such solutions in general, the temperature of the bed should ordinarily be substantially above the boiling point of the solution being dried, for example, 100° F. above the boiling point. Also, in general, the concentration of such solutions entering the drying kiln should range from approximately 60% saturation up to a saturated solution at ambient temperatures. The size of the nuggets or pellets produced depends considerably upon the nature of the material being dried and upon the operating conditions.

With calcium chloride, it has been found that optimum results are obtained when the average overall size of the nuggets or pellets lies between approximately ¼" and ¾". It will be apparent that for any solution being dried, the size of the nuggets or pellets with a given feed depends primarily upon how long they remain in the kiln. The length of time which the nuggets or pellets do remain in the kiln depends primarily upon the rate at which the solute is introduced. The degree to which the nuggets or pellets are dried depends upon the rate of feed and the temperature of the bed, these two factors being somewhat interdependent. In other words, increasing the rate of feed with the same heat input will drop the temperature and vice versa. Decreasing the rate of heat input with the same feed will drop the temperature and vice versa. A high temperature and a low rate of feed produce drier nuggets or pellets, thus increasing the rate of nucleus production and producing smaller units. Either lower temperature, or increased rate of feed, or both, reduces the rate of nucleus production, and this increases the size of the nuggets or pellets. The peripheral speed of the kiln also has some effect on the size of the nuggets or pellets as the higher the speed, the greater the abrasion of the units and the greater the rate of nucleus production. Thus, a low temperature, high rate of feed and slow rotational speed of the kiln tend to produce larger nuggets or pellets, but there is a limit to the size of these units which can be consistently or uniformly produced. The lower temperature and higher rate of feed tend to reduce the drying so that the particles in the peripheral portions of the bed tend to become moist. Adherence of the particles to the wall of the kiln may take place, but usually a critical point is reached at which the entire contents of the kiln suddenly reduces to fines. One or the other of these actions takes place when the moisture content of the outer layers of the particles in the peripheral portions of the bed reaches about 15% at which time the nuggets or pellets begin to take on a moist gray color instead of being white. The process should therefore be operated to produce quickly a moisture content of the particles below approximately 15% in the case of calcium chloride. With calcium chloride, it becomes difficult to produce nuggets or pellets much larger than about 1¼" in diameter. On the other hand, it seems not to be practical to produce nuggets or pellets by my process, which have overall diameters less than about ¼". Maximum throughput is obtained when the nuggets or pellets are between approximately ⅜" and ½" in diameter, although the size of the units can be reduced without much reduction in throughput by increasing the supply of nuclei in a limited area, preferably near the feed end of the kiln. This can be done by producing a local area of higher temperature, thus increasing the rate of nucleus production in such local area. The local area of higher temperature can be produced either by locally decreasing the feed of solution or locally increasing the heat input. Substantially the same result can be secured by directing one of the burners, remote from the discharge end of the kiln, so that the flame directly contacts the bed.

Another way of controlling the size of the nuggets or pellets to secure any desired size below the maximum which can be obtained with any given solution is to continuously feed additional nuclei into the bed in measured or controlled amounts, preferably at a point remote from the discharge from the bed. Such nuclei may be small granular or other shaped particles of the material being dried. The greater the amount of such particles supplied to the bed, the smaller the discharged nuggets or pellets will be. Even relatively large particles approaching the size of the desired final product can thus be supplied to the bed. Irregular-shaped particles, such as granular masses from crushed dry material, will be largely formed into uniform nuggets or pellets by moistening and abrasion as well as by the addition of layers of solid material. The smaller particles in a mixture of large and small particles will be built up by addition of solid material thereto so that the particles or masses finally discharged will be of substantially uniform size. Thus, the process may be employed to convert material made up of irregular particles of mixed sizes into a material made up of nuggets or pellets of nearly uniform size and shape by dissolving a portion only of the original material in a solvent, feeding the resulting solution to the drying apparatus while at the same time also feeding the remaining portion of the material as solid particles. The resulting saving in heat and operating time over a process requiring that all of the original material be dissolved should be apparent. It will also be apparent that I have provided a process and apparatus which enables solid masses to be recovered directly from solutions of solid material in a single operation which eliminates the multiple steps of previous drying operations.

Figure 7:
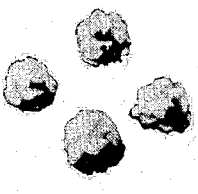
Figure 7 is a photograph (actual size) of a representative group of pellets of calcium chloride produced in accordance with the present invention, and having an average diameter of approximately one-half inch and a true density of 1.64 grams per milliliter.
Figure 8:
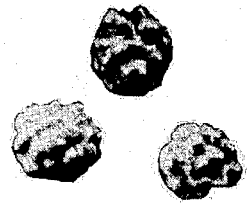
Figure 8 is a photograph (actual size) of a representative group of nuggets of calcium chloride produced in accordance with the present invention and having an average diameter of approximately three-quarters of an inch and a true density of 1.64 grams per milliliter.

Referring to Figures 6, 7 and 8, it will be seen that the pellets, in each instance, are characterized by surfaces made up of extensive protuberances which constitute a relatively large proportion of the total mass of each pellet or nugget. Careful examination of the different pellets reveals that on an overall basis they are remarkably uniform. In gross appearance, the pellets appear to have a coral-like structure. These particles have a high ratio of surface area to true density, and will dissolve very rapidly in a relatively large volume of water. Such pellets are particularly useful for application where a high ratio of exposed surface per weight of product is desired.

While I have disclosed the preferred embodiment of my invention, it is understood that the details may be varied within the scope of the following claims.

I claim:

1. A process for producing pellets of calcium chloride having surface protuberances, which process comprises, establishing a heated bed of particles of a calcium chloride, agitating said bed to cause a circulatory movement of said particles therein and a gradual interchange between the particles in the interior of said bed and those in the peripheral portions of said bed, introducing a calcium chloride solution at points within the interior of said bed to coat the particles in an intermediate portion of said bed with said solution, supplying sufficient heat to said bed to maintain the temperature of said bed substantially above the boiling point of said solution, whereby to substantially dry the coated particles before said coated particles reach the peripheral portions of said bed so that the smaller particles in said bed increase in size and the particles in the peripheral portions of said bed are substantially dry, and discharging dried pellets of calcium chloride from a peripheral portion of said bed.

2. The process called for in claim 1 wherein said bed is at least in part established and maintained by feeding solid particles thereto.

3. A process for producing pellets of calcium chloride having surface protuberances which process comprises, establishing a heated bed of particles of calcium chloride, said bed having an inclined exposed upper surface, agitating said bed to cause rotation of said particles and a circulatory movement of said particles about a substantially horizontal axis extending through said bed and substantially parallel to said upper surface and a gradual interchange between the particles in the interior of said bed and those in the peripheral portion of said bed, introducing a calcium chloride into an intermediate portion of said bed at points below said surface to coat the particles in said portion with said solution, supplying sufficient heat to said bed to maintain the temperature of said bed substantially above the boiling point of said solution, whereby to substantially dry the coated particles before said coated particles reach the peripheral portions of said bed so that the particles in said bed increase in size and become pellet-like in shape with surface protuberances and the particles in the peripheral portions of said bed are substantially dry, and discharging dried pellets from a peripheral portion of said bed.

4. A process for producing pellets of calcium chloride having surface protuberances, which process comprises, establishing an elongated horizontally extending heated bed of particles of calcium chloride, agitating said bed by moving the particles in the lower portion of said bed laterally along said lower portion and then upwardly along one side of said bed to produce a bed having a laterally inclined upper surface and cause a circulatory movement of said particles about a longitudinal axis through said bed and a gradual interchange between the particles in the interior of said bed and those in the peripheral portions of said bed, introducing a solution of calcium chloride having a concentration between approximately 45% to 60% of saturation by weight into the interior of said bed at points below said surface between approximately 10% and 45% of the depth of said bed normal to said surface to coat the particles in the interior of said bed with said solution, supplying sufficient heat to said bed to maintain the temperature of said bed substantially above the boiling point of said solution whereby to substantially dry the coated particles before said coated particles reach the peripheral portions of said bed, whereby the particles in said bed increase in size and become pellet-like in shape, and new particles are broken from the particles in said bed due to said agitation, and discharging dry pellets of calcium chloride from a peripheral portion of said bed.

5. A process for producing pellets of calcium chloride having surface protuberances, which process comprises, establishing a heated bed of bodies of calcium chloride partly filling an elongated cylindrical kiln having its longitudinal axis positioned substantially horizontally so that said bed has an upper surface below said axis, rotating said kiln to cause a circulatory movement of said bodies in said bed about an axis through said bed substantially parallel to the axis of said kiln and a gradual interchange between the bodies in the interior of said bed and those in the peripheral portions of said bed, the rotation of said kiln producing an inclination of the upper surface of said bed, introducing a solution of calcium chloride into the interior of said bed at a plurality of points below said surface and spaced along said kiln to coat the bodies in the interior of said bed with said solution, supplying sufficient heat to said kiln to heat said bed to maintain the temperature of said bed substantially above the boiling point of said solution and substantially dry the coated bodies before said coated bodies reach the peripheral portions of said bed, so that the bodies in said bed increase in size, new bodies form on nuclei broken from bodies in said bed and the bodies in the peripheral portions of the bed are substantially dry, and discharging dry pellets of calcium chloride from the upper surface of said bed at an end of said kiln.

6. The method called for in claim 5 wherein said bed is heated to a temperature at least approximately 100° F. above the boiling point of said solution of calcium chloride.

7. The method called for in claim 5 wherein the bodies of calcium chloride in said peripheral portions of said bed have a moisture content not exceeding 15%.

8. Calcium chloride pellets having an overall diameter of $d$ and a surface area substantially in excess of $\pi d^2$ said excess surface area being provided by protuberances projecting from substantially the entire surface of the individual pellets, said pellets being produced by the process which comprises establishing a heated bed of particles of calcium chloride, agitating the said bed to cause a circulatory movement of said particles therein and a gradual interchange between the particles in the interior of said bed and those in the peripheral portions of said bed, introducing a calcium chloride solution at a point within the interior of said bed to coat the particles in an intermediate portion of said bed with said solution, supplying sufficient heat to said bed to maintain the temperature of said bed substantially above the boiling point of said solution whereby to substantially dry the coated particles before said coated particles reach the peripheral portions of said bed so that the smaller particles in said bed increase in size and the particles in the peripheral portions of said bed are substantially dry, and discharging dried pellets of calcium chloride from a peripheral portion of said bed.

9. Calcium chloride pellets ranging in overall diameter from 1/4"–3/4", having a true density ranging, respectively from 1.32 to 1.64 grams per milliliter, and having a surface area substantially in excess of $\pi d^2$, said excess surface area being provided by protuberances projecting from substantially the entire surface of the individual pellets, said pellets being produced by the method which comprises establishing an elongated horizontally extending heated bed of particles of calcium chloride, agitating said bed by moving the particles in the lower portion of said bed laterally along said lower portion and then upwardly along one side of said bed to produce a bed having a laterally inclined upper surface and cause a circulatory movement of said particles about a longitudinal axis through said bed and a gradual interchange between the particles in the interior of said bed and those in the peripheral portion of said bed, introducing a solution of calcium chloride having a concentration between approximately 45% to 60% of saturation by weight into the interior of said bed at points below said surface between approximately 10% and 45% of the depth of said bed normal to said surface to coat the particles in the interior of said bed with said solution, supplying sufficient heat to said bed to maintain the temperature of said bed substantially above the boiling point of said solution whereby to substantially dry the coated particles before said coated particles reach the peripheral portion of said bed, whereby the particles in said bed increase in size and become pellet like in shape, and new particles are broken from the particles in said bed due to said agitation, and discharging dry pellets of calcium chloride from a peripheral portion of said bed.

ROCK L. COMSTOCK.

References Cited in the file of this patent

UNITED STATES PATENTS

| Number | Name | Date |
| --- | --- | --- |
| 1,869,235 | Bartling | July 26, 1932 |
| 1,922,697 | Heath | Aug. 15, 1933 |
| 1,928,894 | Jeffries | Oct. 3, 1933 |
| 2,154,672 | Downs | Apr. 18, 1939 |
| 2,304,382 | Shoeld | Dec. 8, 1942 |
| 2,340,567 | Sargent | Feb. 1, 1944 |
| 2,374,331 | Cooke | Apr. 24, 1945 |
| 2,393,891 | Dawsey et al. | Jan. 29, 1946 |
| 2,396,689 | Davis | Mar. 19, 1946 |
| 2,400,458 | Hall | May 14, 1946 |
| 2,414,700 | Shoeld | Jan. 21, 1947 |
| 2,436,766 | Davis | Feb. 24, 1948 |
| 2,436,771 | Hood | Feb. 24, 1948 |
| 2,561,055 | Hood | July 17, 1951 |